(12) United States Patent
Kwak et al.

(10) Patent No.: US 8,705,505 B2
(45) Date of Patent: Apr. 22, 2014

(54) DISTRIBUTED MEDIUM ACCESS SCHEDULING WITH IMPLICIT ORDERING

(75) Inventors: Dong Ho Kwak, Hwaseong-si (KR); Chee Ha Kim, Pohang-si (KR); Hyeon Mok Ko, Pohang-si (KR)

(73) Assignee: Postech Academy-Industry Foundation, Pohang-Si, Gyeongsangbuk-Do (KR)

( * ) Notice: Subject to any disclaimer, the term of this patent is extended or adjusted under 35 U.S.C. 154(b) by 255 days.

(21) Appl. No.: 13/184,989

(22) Filed: Jul. 18, 2011

(65) Prior Publication Data

US 2012/0082139 A1     Apr. 5, 2012

(30) Foreign Application Priority Data

Sep. 30, 2010   (KR) .................. 10-2010-0094920

(51) Int. Cl.
  *H04W 4/00*       (2009.01)
  *H04L 12/413*    (2006.01)
  *H04W 74/08*     (2009.01)

(52) U.S. Cl.
  CPC ......... *H04L 12/413* (2013.01); *H04W 74/0825* (2013.01); *H04W 74/085* (2013.01); *H04W 74/0858* (2013.01); *H04W 74/0816* (2013.01)
  USPC .......................................... 370/338; 370/448

(58) Field of Classification Search
  CPC .............. H04L 12/413; H04W 74/08–74/0891
  USPC .......... 370/229–230, 254, 336, 338, 445–448
  See application file for complete search history.

(56) References Cited

U.S. PATENT DOCUMENTS

2006/0242025 A1*  10/2006  Nishihara et al. ............... 705/15
2007/0060141 A1*   3/2007  Kangude et al. ............. 455/445

OTHER PUBLICATIONS

Singh et al., Sticky CSMA/CA: Implicit Synchronization and Real-time QoS in Mesh Networks, Jan. 2007, University of California, pp. 1-39.*

* cited by examiner

*Primary Examiner* — Un C Cho
*Assistant Examiner* — Jeremy Costin
(74) *Attorney, Agent, or Firm* — Kile Park Reed & Houtteman PLLC

(57) ABSTRACT

Provided is distributed medium access scheduling with implicit ordering (DSIO). The DISO includes the steps of: (a) when any terminal of a plurality of terminals included in a terminal group has data to transmit, promoting the terminal to a transmission data existence layer; (b) when any blue terminal of a plurality of blue terminals included in a blue terminal group has no data to transmit, degrading the blue terminal to a transmission data non-existence layer; and (c) when any red terminal of a plurality of red terminals included in a red terminal group succeeds in intruding between the blue terminals and recognizes whether or not to transmit data without a collision, promoting the red terminal to the blue terminal group.

5 Claims, 4 Drawing Sheets

(An Internal Structure of a Transmission Unit When a Conventional Distributed Coordination Function(DCF) is Used)

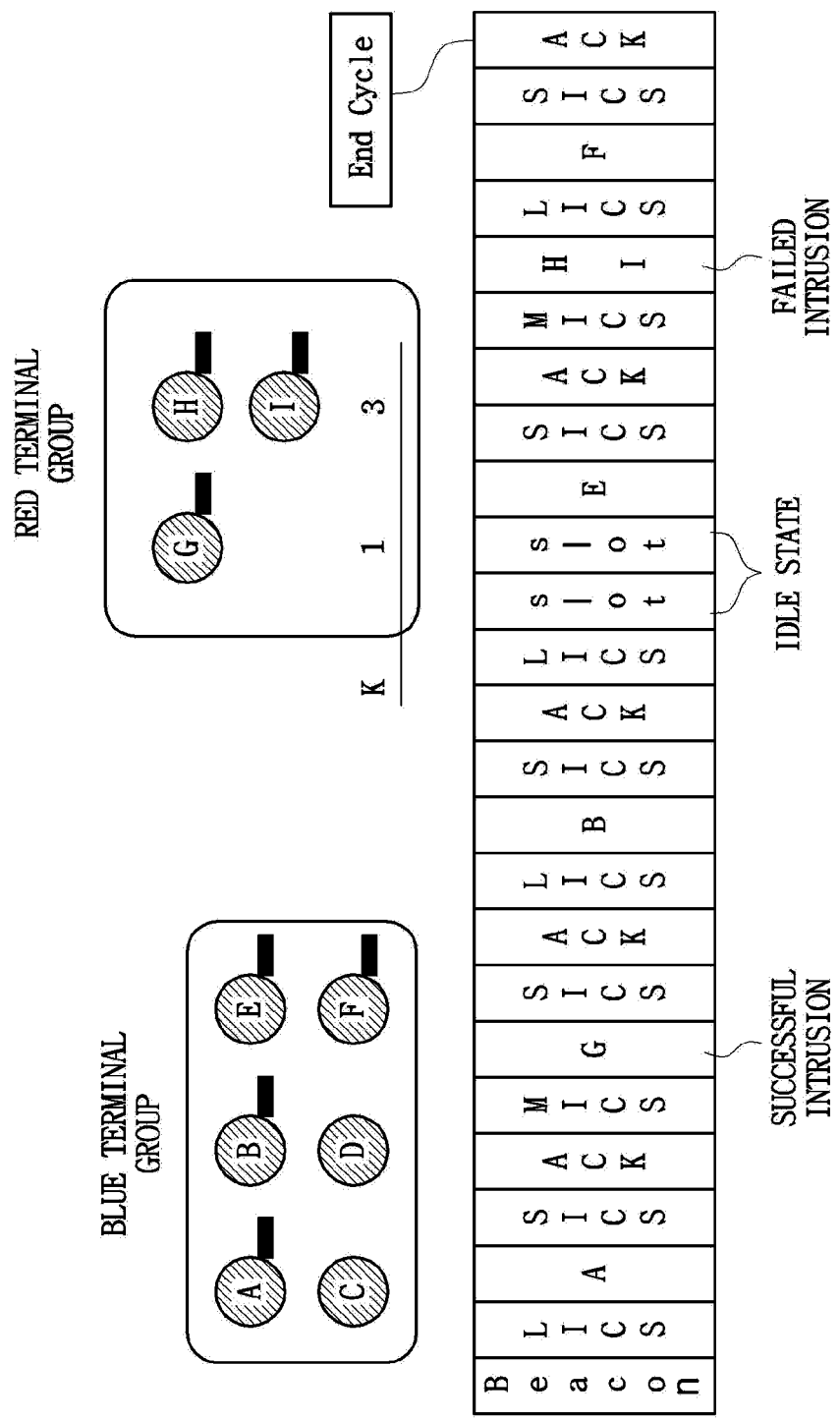

DISTRIBUTED MEDIUM ACCESS SCHEDULING WITH IMPLICIT ORDERING

BACKGROUND OF THE INVENTION

1. Field of the Invention

The present invention relates to distributed medium access scheduling with implicit ordering (hereinafter, referred to as "DSIO"), and more particularly, to DSIO which is capable of realizing higher throughput than a distributed coordination function (DCF) at all times by substituting for the DCF as a medium access control method which is basically used in the IEEE 802.11 wireless LAN.

2. Description of the Related Art

Recently, the IEEE 802.11 wireless LAN has been widely used for wireless Internet access, because of the simplicity of installation and a low cost. Currently, the IEEE 802.11 wireless LAN defines two different media access control schemes.

A basic access method uses the DCF which may be used for both an ad-hoc network environment and an infra-structured network environment, as a general carrier sense multiple access with collision avoidance (CSMA/CA) scheme.

Furthermore, a medium access control scheme called a polling-based point coordination function (PCF) may be selectively used.

When a wireless communication system has broadcasting characteristics and uses channels of the same band, two terminals cannot transmit signals at the same time. When two or more terminals transmit signals at the same time, a collision may occur, and thus all transmissions are failed.

FIG. 1 shows an internal structure of a transmission unit when a conventional DCF is used.

Referring to FIG. 1, when the conventional DCF is used, the transmission unit includes three inter frame spaces (IFS), that is, a short inter frame space (SIFS), a PCF inter frame space (PIFS), a DCF inter frame space (DIFS), in order to implement the IEEE 802.11 media access control scheme.

The IFS refers to a minimum waiting time which is necessarily required before a next frame transmission operation is performed after one frame is transmitted.

The relation among the respective IFSs is set as follows: SIFS<PIFS<DIFS. Since the SIFS is the shortest, the SIFS is used for a communication having the highest priority.

Hereinafter, a general method in which a collision occurring in a wireless environment is stochastically avoided through the DCF will be described.

Before all terminals transmit data, the DCF selects an arbitrary back-off number as a lower value than a contention window value, in order to avoid a collision between the transmission terminals.

The initial contention window value is set to CWmin, and it is checked whether a transmission medium is occupied by another terminal or not. At this time, when the transmission medium is not used during a predetermined DIFS, this state is considered as an idle state, and back-off is started.

When a transmission of another terminal is not performed during a predetermined slot time, the back-off number is decreased by ones. When the back-off number becomes zero, data is transmitted. When the transmission of another terminal is recognized, the back-off is stopped, and when the transmission medium becomes idle during the DIFS, the back-off is resumed.

When the back-off number becomes zero and the transmission medium is idle, transmission is started. A terminal receiving the data transmits an ACK after a predetermined SIFS to acknowledge a successful transmission.

The SIFS is smaller than the DIFS, and the transmission of another terminal does not interfere with the transmission of the ACK frame through the SIFS. When an ACK frame is not received, it is considered that the transmission is failed, and the contention window is doubled.

The maximum size of the contention window is CWmax. When a transmission is successfully performed, the contention window is reset to CWmin.

The conventional DCF has been essentially adopted as the medium access control scheme of the IEEE 802.11 wireless LAN. However, the conventional DCF generally exhibits low performance. In particular, as the number of terminals increases, collisions frequently occur. Back-off slots which are not used may cause the waste of bandwidth. As a result, the conventional DCF has a low transmission rate.

Meanwhile, a variety of schemes have been proposed to solve the above-described problems. However, in a general contention-based distributed medium access control scheme, a trade-off relation is established between collisions and back-off slots which are not used. In this case, when one is to be reduced, another is increased. Therefore, there is a limit in realizing desired performance improvement through such an access control scheme.

SUMMARY OF THE INVENTION

Accordingly, the present invention has been made in an effort to solve the problems occurring in the related art, and an object of the present invention is to provide DSIO which is capable of substituting for the DCF that is basically used in the IEEE 802.11 wireless LAN system.

In order to achieve the above object, according to one aspect of the present invention, there is provided DSIO of the IEEE 802.11 wireless LAN system, which uses a transmission data non-existence layer including a terminal group having no data to transmit; and a transmission data existence layer including a blue terminal group that recognizes whether or not to transmit data without a collision and a red terminal group that does not recognizes whether or not to transmit data without a collision. The DISO includes the steps of: (a) when any terminal of a plurality of terminals included in the terminal group has data to transmit, promoting the terminal to the transmission data existence layer; (b) when any blue terminal of a plurality of blue terminals included in the blue terminal group has no data to transmit, degrading the blue terminal to the transmission data non-existence layer; and (c) when any red terminal of a plurality of red terminals included in the red terminal group succeeds in intruding between the blue terminals and recognizes whether or not to transmit data without a collision, promoting the red terminal to the blue terminal group.

BRIEF DESCRIPTION OF THE DRAWINGS

The above objects, and other features and advantages of the present invention will become more apparent after a reading of the following detailed description taken in conjunction with the drawings, in which:

FIG. 4 is a diagram showing a first example for implementing the DSIO according to the embodiment of the present invention.

DETAILED DESCRIPTION OF PREFERRED EMBODIMENTS

Figure 1:
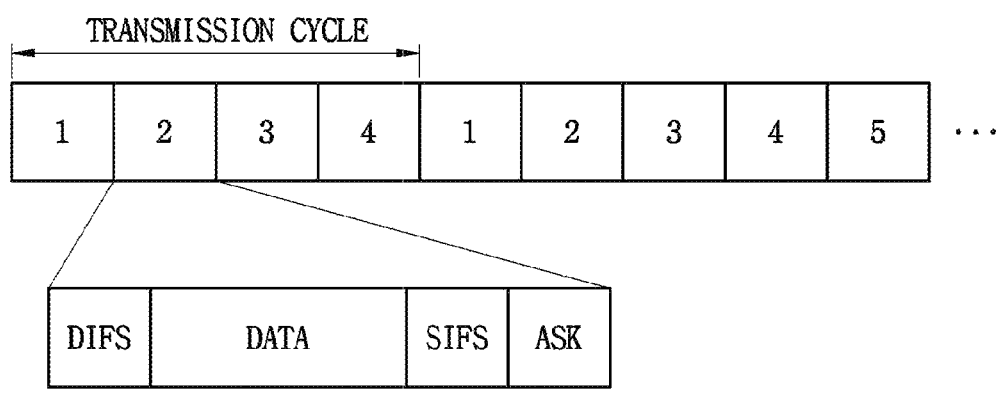
FIG. 1 is a diagram showing the internal structure of a transmission unit when a conventional DCF is use.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
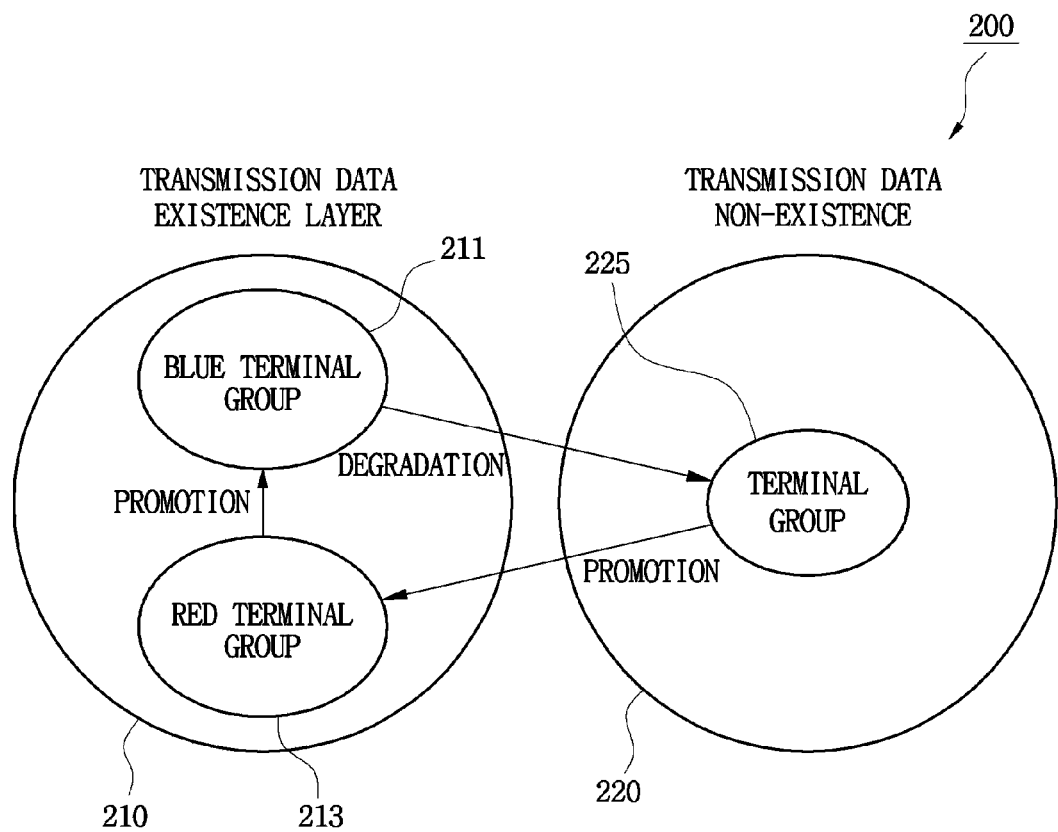
FIG. 2 is a diagram explaining DSIO according to an embodiment of the present invention.

FIG. 2 is a diagram explaining distributed medium access scheduling with implicit ordering (hereinafter, referred to as "DSIO") according to an embodiment of the present invention.

Referring to FIG. 2, a transmission data existence layer 210 including a blue terminal group 211 and a red terminal group 213 and a transmission data non-existence layer 220 including a terminal group 225 are provided to implement the DSIO according to the embodiment of the present invention.

The blue terminal group 211 includes a plurality of blue terminals, the red terminal group 211 includes a plurality of red terminals, and the terminal group 225 includes a plurality of terminals.

First, the terminals are divided into the transmission data existence layer 210 and the transmission data non-existence layer 225, depending on whether the terminals have data to transmit or not.

In the transmission data existence layer 210, the blue terminal group 211 recognizes when to transmit data to an on layer having data to transmit without any collisions, and the red terminal group 213 does not recognize when to transmit data without any collisions.

The plurality of terminals included in the transmission data non-existence layer 225 do not have data to transmit to an off layer which does not have data to transmit.

In the embodiment of the present invention, the transmission data existence layer 210 is classified into the blue terminal group 211 and the red terminal unit 213, and unique functions are granted to the respective groups. Accordingly, the above-described problems may be equalized to the following two problems.

The first problem is how to guarantee the blue terminals the transmission without collisions. The second problem is how to promote the red terminals to the blue terminals.

When the two above-described problems are solved, all the terminals come to recognize their own transmit-priorities, and may transmit data without collisions, even though the existing collision avoidance scheme is not used.

Meanwhile, a blue terminal having no data to transmit may be transferred to the transmission data non-existence layer 225, in order to effectively use the transmission medium. Therefore, the second problem includes a problem of how to degrade the blue terminal to the transmission data non-existence layer 225.

In order to solve the above-described problems, the DSIO according to the embodiment of the present invention needs to satisfy the following three requirements.

First, a blue terminal may transmit data without a collision, even though the blue terminal does not use a collision avoidance scheme.

Second, the promotion of a red terminal and the degradation of a blue terminal may be performed by small resource consumption.

Third, the above-described processes may be independently performed by the respective terminals, without a manager.

Hereinafter, a principle in which the three requirements are satisfied by the DSIO according to the embodiment of the present invention will be described in detail.

The DSIO according to the embodiment of the present invention includes three different IFSs, that is, a short inter-class space (SICS), a medium inter-class space (MICS), and a long inter-class space (LICS), similar to the DCF. They have a relation of SICS<MICS<LICS.

Furthermore, one slot time is defined as a sufficient length for determining whether another terminal uses the medium or not, as in the IEEE 802.11.

The first requirement may be satisfied by settling and repeating transmission orders. That is, when all the blue terminals 211 recognize their own orders and the total number of blue terminals, each of the blue terminals may transmit data without a collision, in case where the medium maintains an idle state at the blue terminal's order during the LICS, and a reception terminal transmits an ACK frame informing the blue terminal of the successful transmission after the SICS.

When all the blue terminals complete the data transmission, one transmission cycle is terminated.

The second requirement has been frequently researched in the scheduling and polling field. However, the promotion and degradation cannot be properly processed at a low cost by any distributed schemes.

Hereinafter, the principle in which a red terminal is promoted to a blue terminal and a blue terminal recognizes its transmission order and the total number of blue terminals will be described by using the DISO according to the embodiment of the present invention.

As described above, blue terminals transmit data according to a predetermined order. A red terminal may intrude before the transmission of a blue terminal. The red terminal uses the MICS which is shorter than the LICS, in order to intrude before the blue terminal.

A beacon frame is broadcast to the respective terminals by an access point (AP) at a start point of each transmission cycle, and specifies the total number n of blue terminals (n is a positive integer), in order to support the communication of the red terminal.

The red terminal arbitrarily selects k which is smaller than n (0≤k (positive integer)≤n−1) at the start point of the transmission cycle, in order to decide before which blue terminal the red terminal is to intrude.

When the medium is idle during the MICS and a transmission of a (k−1)-th terminal was ended or the order thereof was passed, the red terminal having a value of k tries a transmission.

At this time, a plurality of red terminals having a value of k may exist. In this case, the respective terminals try a transmission at a transmission probability of p, in order to avoid collisions, or give up a transmission at a transmission probability of (1−p). A red terminal having given up a transmission waits for the next transmission cycle.

When a red terminal receives an ACK frame, the red terminal is promoted to a blue terminal at the end of the transmission cycle (end cycle). All the other blue terminals and the red terminals increase n by 1.

The first red terminal which has successfully intruded becomes an (n+1)-th blue terminal at the next transmission cycle. When one or more red terminals succeed in intrusion, the numbers occupied by the red terminals becomes (n+1), (n+2), . . . .

Meanwhile, the process of granting a number to a red terminal which is promoted is not limited to the above-described example, but may be modified in various manners. For example, when a red terminal is promoted, 1 or k may be occupied by the red terminal.

When a red terminal does not receive an ACK frame, the red terminal considers that a collision occurred, and reduces the transmission probability p to the half to try a transmission at the next transmission cycle. The minimum value of the transmission probability p is $p_{min}$, and may be properly adjusted by considering the degree of the transmission fail.

When the transmission cycle is ended, a new transmission cycle is started by the beacon frame. When the transmission cycle is ended, a red terminal succeeding in intrusion is promoted to a blue terminal, forms a group with the other blue terminals, and waits for the next transmission cycle.

Meanwhile, a blue terminal having no data to transmit performs a process in which the blue terminal does not transmit data at its transmission order and skips a transmission, while the blue terminal is transferred to the transmission data non-existence layer 220.

At this time, when a slot time passes in a state in which a transmission is not performed after the LICS, the other blue terminals recognize that the corresponding blue terminal skipped a transmission.

That is, when the other blue terminals recognize that the blue terminal having no data to transmit was transferred to the transmission data non-existence layer 220, the total number n of blue terminals is decreased by 1. At this time, the transmit-priorities of blue terminals which have not taken their transmission orders are decreased by 1 such that the blue terminals may occupy higher transmit-priorities.

When a transmission is not performed continuously during several slot times, it may mean that sequent blue terminals do not perform a transmission but skipped a transmission. At this time, another blue terminal in its transmission order does not wait for the LICS, but immediately transmit data, in case where the blue terminal has data to transmit.

Through the DSIO according to the embodiment of the present invention, all terminals may recognize that the transmission order of a previous terminal is passing, when data is transmitted or an idle state is maintained during a slot time. Therefore, a collision between the respective blue terminals does not occur, and an additional collision avoidance scheme is not required.

Meanwhile, when a terminal having data to transmit occurs among the plurality of terminals composing the terminal group 225, the terminal is promoted to the red terminal group 213, and the red terminal may transmit data through a process in which the red terminal intrudes between the blue terminals.

When the DSIO according to the embodiment of the present invention is used, the above-described three requirements may be satisfied. This will be described briefly as follows.

First, a blue terminal may transmit data without a collision, even though the blue terminal does not use a collision avoidance scheme. Second, a red terminal may be promoted to a blue terminal without an additional cost, and a blue terminal may be degraded to the transmission data non-existence layer 220 by using one slot time requiring a very small cost. Third, the above-described processes may be performed independently by the respective terminals.

Hereinafter, referring to FIGS. 3 and 4, a specific embodiment to which the DSIO is applied will be described in detail.

Figure 3:
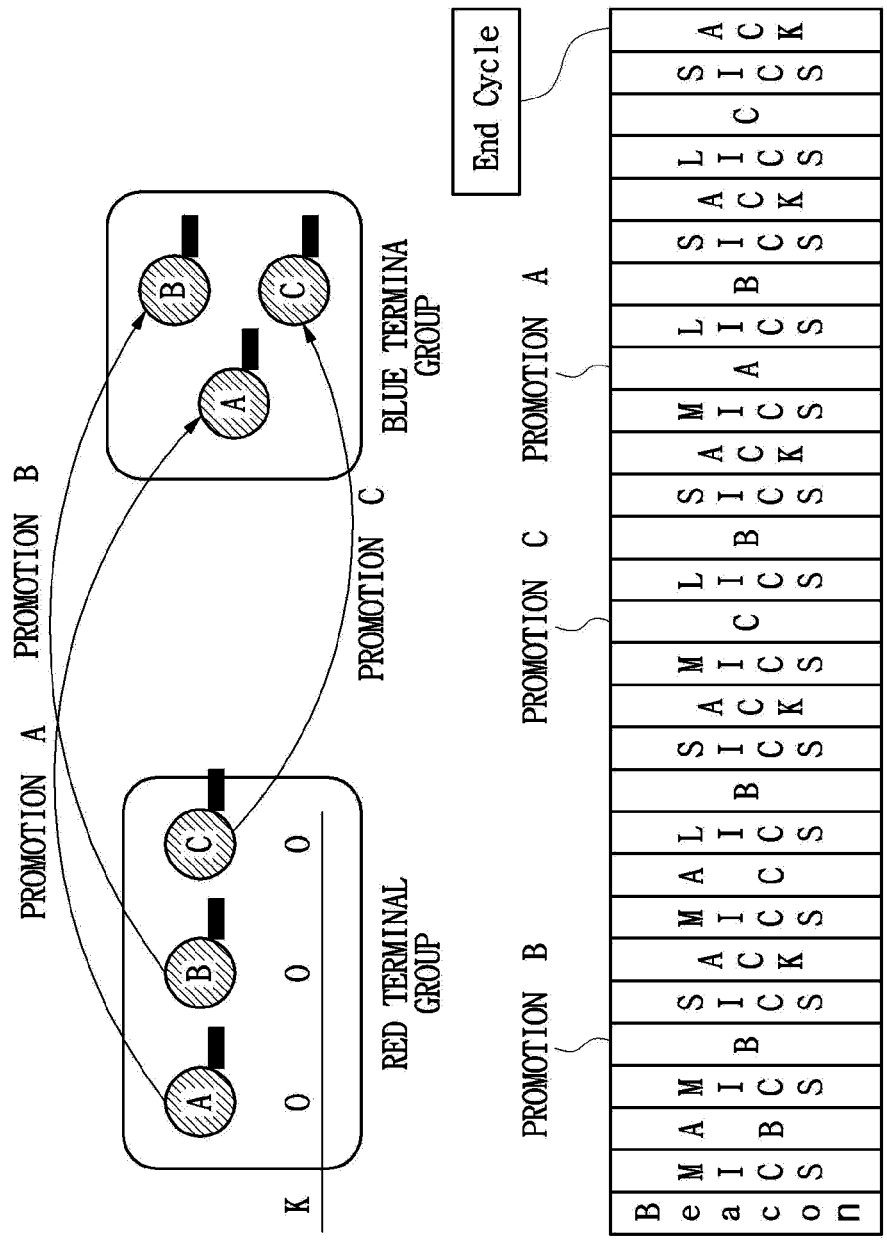
FIG. 3 is a diagram showing that red terminals are promoted to blue terminals, in an initial state for realizing the DSIO according to the embodiment of the present invention.

FIG. 3 is a diagram showing an example in which a plurality of terminals operates in the initial state.

Referring to FIG. 3, red terminals A, B, and C have the same value k of 0 (k=0) in the initial state, because no blue terminals exist. FIG. 3 shows that the red terminals A, B, and C are promoted to blue terminals in an order of B, C, and A, for example.

The promotion process may be described in detail as follows. The red terminals B, C, and A, respectively, try intrusion at a probability of p immediately after an MICS. When a collision does not occur between the red terminals, an AP generates an ACK reception signal to acknowledge the successful intrusion. When the transmission cycle is ended, the red terminals are promoted to blue terminals.

Meanwhile, since the red terminals A and B and the red terminals A and C, respectively, participate in intrusion at the same time, collision occurs, and the AP does not generate an ACK reception signal. As a result, the red terminals fail to be promoted to blue terminals.

FIG. 4 shows a first example for realizing the DSIO according to the embodiment of the present invention.

Referring to FIG. 4, six blue terminals A to F (n=6) and three red terminals G to I are provided. At a start point of a transmission cycle, the terminals A, B, E, F, G, H, and I have data to transmit, but the terminals C and D have no data to transmit.

The transmit-priorities of the blue terminals are set in an order of A (priority 0), B (priority 1), C (priority 2), D (priority 3), E (priority 4), and F (priority 5), and the intrusion priorities k of the red terminals G, H, and I are set to 1, 3, and 3, respectively.

Hereinafter, the principle in which the data transmission orders of the respective terminals are decided and the respective terminals are degraded and promoted according to the transmit-priorities will be described.

When a transmission start is broadcast by a beacon frame, the blue terminal A (priority 0) starts a transmission immediately after an LICS, and the AP generates an ACK signal to acknowledge a successful transmission.

Then, the red terminal G (k=1) intrudes immediately after an initial MICS, and the AP generates an ACK signal to acknowledge a successful intrusion.

Then, the blue terminal B (priority 1) successfully transmits data according to the same process as that of the blue terminal A (priority 0).

Meanwhile, since the blue terminals C and D (priority 2 and priority 3) have no data to transmit, the blue terminals C and D skip their transmission orders, and an idle state is maintained during two slot times.

Meanwhile, since the blue terminal E (priority 4) recognizes that the blue terminals C and D skipped their transmission orders, the blue terminal E comes to have priority 2 which is decreased by 2 from priority 4. Therefore, the blue terminal E transmits data before the red terminal H (k=3).

In this case, the blue terminal E does not wait for LICS differently from the transmission of the blue terminal A, but transmits data immediately after the slot times.

After the blue terminal E transmits data, the red terminals H (k=3) and I (k=3) having the same priority try an intrusion at the same time. Accordingly, a collision occurs therebetween, and the red terminals H and I fail to intrude, because they do not receive an ACK signal.

The blue terminal F recognizes that the blue terminals C and D skipped their transmission orders, and comes to have priority 3 which is decreased by 2 from priority 5, as in the case of the blue terminal E. Finally, the blue terminal F transmits data.

When an ACK signal to acknowledge a successful transmission of the blue terminal F is received, one transmission cycle is ended.

When the end of the one transmission cycle is broadcast (end cycle), the red terminal G having succeeded in intrusion is promoted to a blue terminal, the blue terminals C and D having no data to transmit are degraded to the transmission data non-existence layer 220, and the red terminals H and I which did not succeed in intrusion reduce the transmission probability p into the half and prepare for the next transmission.

According to the embodiment of the present invention, the DSIO not only may transmit data without a collision even though the conventional collision avoidance scheme is not used, but also may realize high throughput than the DCF by substituting for the DCF.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A method for distributed medium access scheduling with implicit ordering (DSIO) of an IEEE 802.11 wireless local area network (LAN) system, which uses a transmission data non-existence layer including a terminal group having no data to transmit, and a transmission data existence layer including a blue terminal group that recognizes whether or not to transmit data without a collision and a red terminal group that does not recognize whether or not to transmit data without a collision, the method comprising:

(a) when a terminal of a plurality of terminals included in the terminal group has data to transmit, promoting the terminal to the transmission data existence layer;

(b) when a blue terminal of a plurality of blue terminals included in the blue terminal group has no data to transmit, degrading the blue terminal to the transmission data non-existence layer; and (c) when a red terminal of a plurality of red terminals included in the red terminal group succeeds in intruding between the blue terminals and recognizes whether or not to transmit data without a collision, promoting the red terminal to the blue terminal group, wherein the red terminal receives a beacon frame from an access point, determines a total number of blue terminals in the blue terminal group based on the beacon frame, determines, based on the total number of blue terminals, a priority k corresponding to where the red terminal is to intrude between the blue terminals, and intrudes between the blue terminals based on the priority k, wherein the degrading the blue terminal occurs after the blue terminal skips a transmission at a transmission order of the blue terminal, and information of the skipping is recognized when a slot time maintains an idle state, wherein when the slot time maintains the idle state, another blue terminal having data to transmit and a lower priority than the blue terminal having no data to transmit recognizes that the blue terminal having no data to transmit skipped a transmission, and wherein the another blue terminal participates in data transmission with a priority which is decreased by the number of slots from a previously-granted transmission priority of the another blue terminal.

2. The method according to claim 1, wherein the blue terminal recognizes a previously-granted transmit-priority, receives the beacon frame from the access point, and determines the total number of blue terminals in the blue terminal group based on the beacon frame.

3. The method according to claim 1, wherein, when inter-frame spaces (IFS) having different time spaces are defined according to a relation of short inter-class space (SICS) medium inter-class space (MICS) long inter-class space (LICS), the blue terminal transmits data after the LICS passes, and the red terminal intrudes immediately after the MICS passes.

4. The method according to claim 3, wherein the red terminal tries intrusion at a transmission probability of p, and gives up a transmission at a probability of (I–p).

5. The method according to claim 1, wherein the another blue terminal does not wait for an LICS after the slot time passes, but immediately transmits data.

* * * * *